United States Patent
Huang

(10) Patent No.: US 9,772,728 B2
(45) Date of Patent: Sep. 26, 2017

(54) CAPACITIVE TOUCH PANEL WITH ADDITIONAL SUBSIDIARY RECEIVER MESH ELECTRODES

(71) Applicants: Interface Optoelectronics (Shenzhen) Co., Ltd., Shenzhen, Guangdong (CN); GENERAL INTERFACE SOLUTION LIMITED, Miaoli County (TW)

(72) Inventor: Kung-Chieh Huang, Taoyuan County (TW)

(73) Assignees: INTERFACE OPTOELECTRONICS (SHENZHEN) CO., LTD., Shenzhen, Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 121 days.

(21) Appl. No.: 14/555,681

(22) Filed: Nov. 27, 2014

(65) Prior Publication Data

US 2015/0123942 A1   May 7, 2015

(30) Foreign Application Priority Data

Nov. 18, 2014  (CN) .......................... 2014 1 0660046

(51) Int. Cl.
*G06F 3/045* (2006.01)
*G06F 3/044* (2006.01)

(52) U.S. Cl.
CPC .... *G06F 3/044* (2013.01); *G06F 2203/04112* (2013.01)

(58) Field of Classification Search
CPC .................. G06F 3/044; G06F 2203/04112
See application file for complete search history.

(56) References Cited

U.S. PATENT DOCUMENTS

| | | | |
|---|---|---|---|
| 8,711,292 B2* | 4/2014 | Guard | G06F 3/0412 178/18.03 |
| 9,019,232 B2* | 4/2015 | Kang | G06F 3/044 178/18.03 |
| 2012/0105356 A1* | 5/2012 | Brosnan | G06F 3/044 345/174 |
| 2013/0278521 A1* | 10/2013 | Kim | G06F 3/0412 345/173 |
| 2014/0327650 A1* | 11/2014 | Lin | G06F 3/04886 345/174 |
| 2015/0242025 A1* | 8/2015 | Cok | G06F 3/046 29/622 |

* cited by examiner

*Primary Examiner* — Kwang-Su Yang
(74) *Attorney, Agent, or Firm* — Locke Lord LLP; Tim Tingkang Xia, Esq.

(57) ABSTRACT

A capacitive touch panel is provided in the present invention, which includes a transparent substrate, a plurality of emitter mesh electrode strips, a plurality of receiver mesh electrode strips, and a plurality of subsidiary receiver mesh electrode blocks, where the emitter mesh electrode strips, the receiver mesh electrode strips and the subsidiary receiver mesh electrode strips are disposed in different layers on the transparent substrate, and the receiver mesh electrode strips and the subsidiary receiver mesh electrode blocks are partially overlapped.

13 Claims, 5 Drawing Sheets

CAPACITIVE TOUCH PANEL WITH ADDITIONAL SUBSIDIARY RECEIVER MESH ELECTRODES

BACKGROUND OF THE INVENTION

1. Field of the Invention

The present invention generally relates to a capacitive touch panel, and more particularly, to a capacitive touch panel with multilayer receiver mesh electrodes.

2. Description of the Prior Art

A touch panel can detect touch action on an active region or display region. For example, it can detect if the user touches a touch button having the form of an image by using fingers, or can detect the position of the fingers and their track. Certain touch panels may detect the touch action performed by the object other than fingers, such as the stylus pen which can generate digital signal, to perform more precise touch actions, writings or even drawings.

Nowadays the touch panel may have various technologies or types, such as resistive type, capacitive type, infrared type, or surface acoustic type. At present the capacitive touch-sensing is the most popular and mature touch technology, in which the principle lies in the change of capacitance value of the electrode in the panel when the object touches or closes the panel surface, and the touch position and its track can be calculated and determined through this capacitance change. In the past the sensing electrode of capacitive touch panel is usually made of tin-doped indium oxide (ITO). This material is quite expensive and has higher resistance, thus it is not a suitable material for the application of a large-size panel. So far many materials or technologies are developed in the industry to replace the use of ITO, such as the use of metal mesh, carbon nanotube (CNT), silver nanowire, grapheme and conductive polymer, etc. For the moment the technology of metal mesh is almost mature and can be run smoothly in mass production. It may be one of the candidates to replace traditional ITO electrode and sweep into the mainstream.

In spite of smooth development, there are still some process bottlenecks to break through. One of them is the problem of compatible control IC. The touch panel using metal mesh electrodes would require more touch-sensing channels than the one using other touch technology. This disadvantage is apparent under the application of large-size panels. For example, a 55-inch touch panel with 5 mm pitch spec may need 381 sensing channels, which is twice the number required in a 27-inch touch panel. This channel number is far beyond the ability of common control IC. Accordingly, the disadvantage of excessive sensing channels in metal mesh electrode is still an intractable problem for the developers in the art to deal with.

SUMMARY OF THE INVENTION

In view of the problem that conventional touch panel technology can't solve, the present invention provides a novel capacitive touch panel design with additional subsidiary receiver mesh electrodes in the electrode construction to divide the original touch control region of the touch panel into multiple individual sensing blocks, so that the number of required sensing channels in control IC can be therefore reduced in the operation.

One objective of the present invention is to provide a capacitive touch panel, which includes a transparent substrate, a plurality of emitter mesh electrode strips, a plurality of receiver mesh electrode strips, and a plurality of subsidiary receiver mesh electrode blocks, wherein the emitter mesh electrode strips, the receiver mesh electrode strips and the subsidiary receiver mesh electrode blocks are disposed in different layers on the transparent substrate, and the receiver mesh electrode strips partially overlap the subsidiary receiver mesh electrode blocks.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings.

Figure 1:
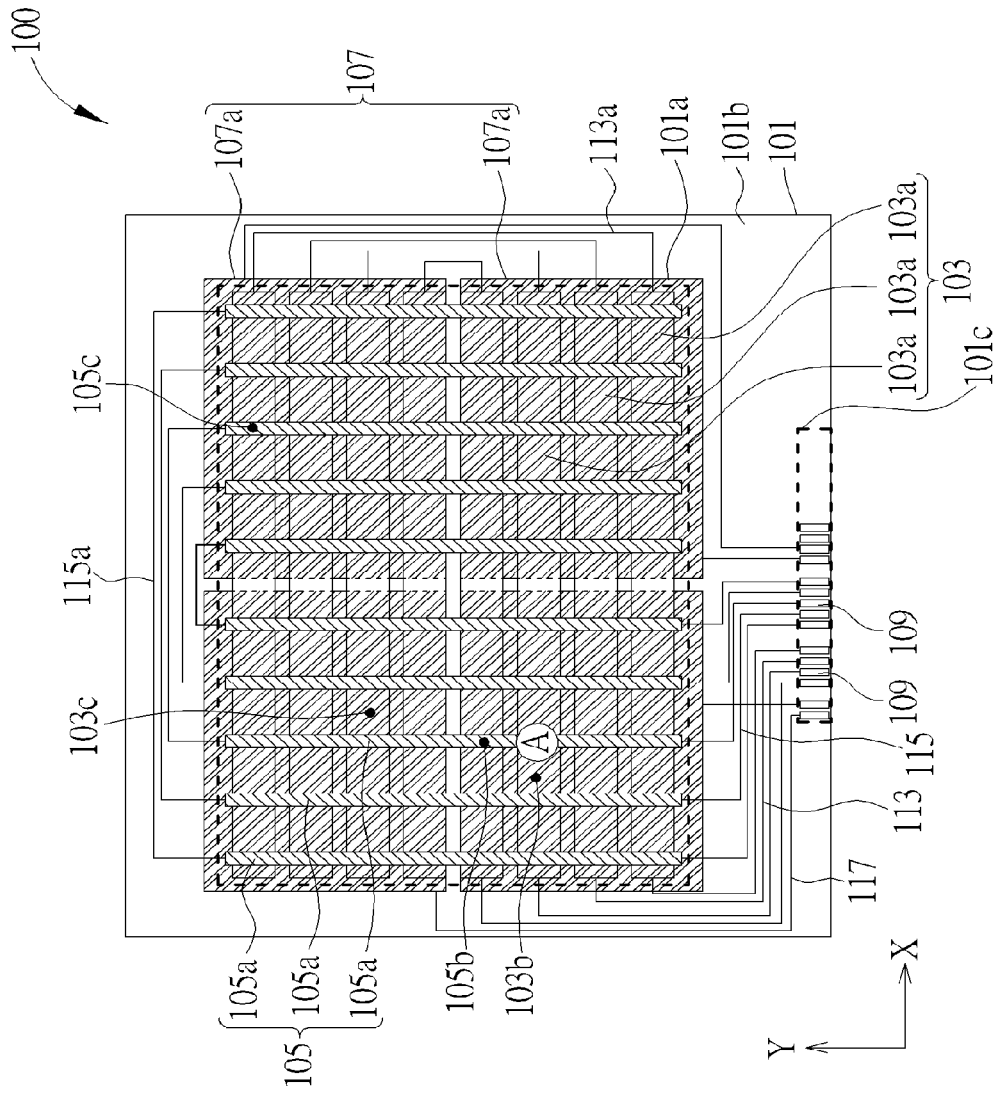
FIG. 1 is a top view schematically illustrating a capacitive touch panel in accordance with the embodiment of the present invention.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

In the following detailed description of the present invention, reference is made to the accompanying drawings which form a part hereof and is shown by way of illustration and specific embodiments in which the invention may be practiced. These embodiments are described in sufficient details to enable those skilled in the art to practice the invention. Other embodiments may be utilized and structural, logical, and electrical changes may be made without departing from the scope of the present invention. The following detailed description, therefore, is not to be taken in a limiting sense, and the scope of the present invention is defined by the appended claims.

First, please refer to FIG. 1, which is a top view schematically illustrating a capacitive touch panel 100 in accordance with the embodiment of the present invention. In this exemplary embodiment, the capacitive touch panel 100 includes a transparent substrate 101, for example a glass substrate, or a plastic sheet made of materials such as PET (polyethylene terephthalate), PC (poly-carbonate), PMMA (poly methyl methacrylate), PEN (polyethylene naphthalate), PES (polyethersulpon), COP (cyclic olefin polymer), TAC (triacetylcellulose), PVA (polyvinyl alcohol), PI (polyimide), PS (polystyrene). The substrate serves as a base for all kinds of electrode structures required to be deposited thereon in the present invention. An inner touch control region (active region) 101a and an outer peripheral region 101b around the panel are defined on the surface of transparent substrate 101. An emitter electrode (Tx) 103 and a receiver electrode (Rx1) 105 are disposed in the touch control region 101a on the transparent substrate 101. In the embodiment, the emitter electrode 103 may include a plurality of parallel emitter electrode strips 103a extending in X direction (a first direction). The emitter electrode strips generally encompass the whole touch control region 101a. The receiver electrode 105 includes a plurality of parallel receiver electrode strips 105a extending in Y direction (a second direction). The emitter electrode strips 103a are orthogonal to the receiver electrode strips 105a. It should be noted that, in the embodiment, the receiver electrode strips 105a do not encompass the whole touch control region 101a like the emitter electrode strips 103a. Instead, it is uniformly disposed in the touch control region 101a in the form of spaced narrow strips. However, the present invention doesn't intend to limit the emitter electrode 103 and receiver electrode 105 to the form shown in FIG. 1. In other embodiments, the emitter electrode strip 103a and the receiver electrode strip 105a may have different shapes, different numbers of the electrode block or different arrangements, depending on the invention requirement. For example, the electrode blocks of the emitter electrode 103 and the receiver electrode 105 may be rectangular, square, rhombus-shaped, circular or irregular-shaped. The emitter electrode strips 103a and the receiver electrode strips 105a may be obliquely arranged rather than orthogonally arranged, but not limited thereto.

Refer again to FIG. 1, one essential feature of the present invention is that, in addition to the above-identified emitter electrode (Tx) 103 and receiver electrode (Rx1) 105, at least one subsidiary receiver electrode (Rx2) 107 is disposed on the touch control region 101a of the transparent substrate 101. The subsidiary receiver electrode 107 is an additional receiver electrode independent from the receiver electrode 105. The function of the subsidiary receiver electrode 107 in the present invention is to define a plurality of touch-sensing blocks on the touch control region 101a of the transparent substrate 101. As shown in FIG. 1, in the embodiment, the subsidiary receiver electrode 107 is composed of four subsidiary receiver electrode blocks 107a, which generally encompasses the whole touch control region 101a and divide the touch control region 101a into four sensing quadrants. The subsidiary receiver electrode 107 in the form of multiple blocks is one of the essential features to achieve the purpose of reducing the number of sensing channels in the present invention. The detailed principle will be described in the following embodiment.

Figure 5:
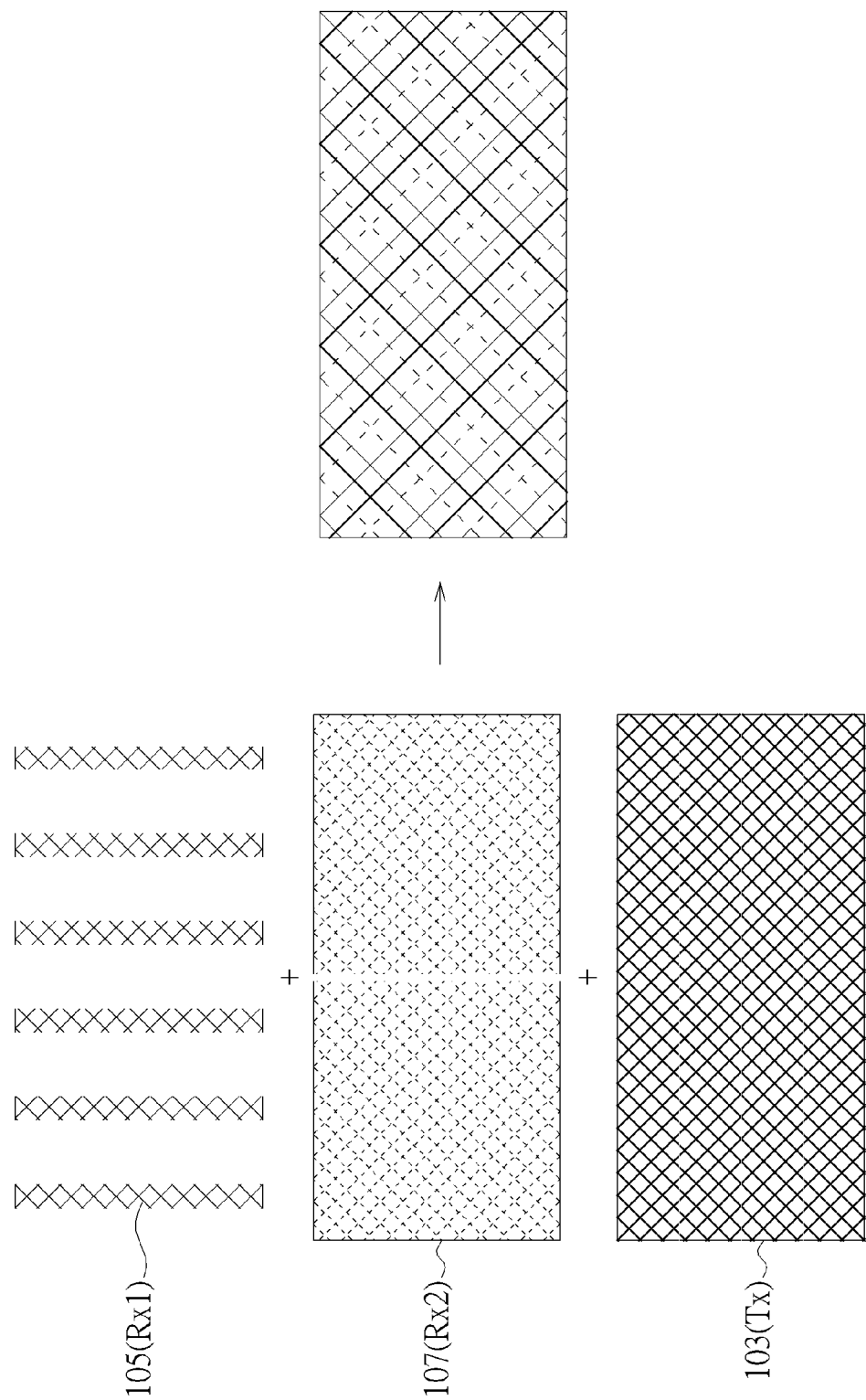
FIG. 5 is a schematic view illustrating the mesh patterns and an overlapped mesh pattern of all mesh electrodes in accordance with the embodiments of the present invention.

Please note that, in the embodiment of the present invention, the emitter electrode (Tx) 103, receiver electrode (Rx1) 105, and the subsidiary receiver electrode (Rx2) 107 are all constructed by "metal mesh", whose structural details are shown in FIG. 5. In the present invention, using metal mesh to constitute all kinds of electrodes and disposing the electrodes in specific arrangement is also one essential feature. Accordingly, in the following embodiments, the emitter electrode, the receiver electrode, and the subsidiary receiver electrode are referred respectively as the emitter mesh electrode, the receiver mesh electrode, and the subsidiary receiver mesh electrode, which means the electrode structure is formed of metal mesh. The arrangement model of the mesh patterns of all kinds of electrodes will be explained in detail in the following embodiments. In addition, the subsidiary receiver mesh electrode 107 shown in the embodiment of FIG. 1 is in the form of single layer and four sensing blocks (quadrants). However, please note that, in the concept of the present invention, the subsidiary receiver mesh electrode 107 may be disposed in one or more layers, such as Rx3, Rx4 . . . , to achieve better efficacy. Furthermore, the number of the subsidiary receiver mesh electrode blocks 107a is not limited to four as shown in the figure. The number of the electrode blocks 107a is not limited in the present invention as long as the entire touch control region 101a can be divided into multiple blocks/regions.

In another aspect of the present invention, please note that the emitter mesh electrode 103, the receiver mesh electrode 105, and the subsidiary receiver mesh electrode 107 are disposed respectively in different layers or levels on the transparent substrate 101. This means the emitter mesh electrode 103, the receiver mesh electrode 105, and the subsidiary receiver mesh electrode 107 are overlapped instead of being disposed on one plane. For simplicity reason, only one exemplary transparent substrate 101 is illustrated in FIG. 1. In actual practice, the emitter mesh electrode 103, the receiver mesh electrode 105, and the subsidiary receiver mesh electrode 107 are disposed on different transparent substrates (or electrode films) 101. Relevant description will be given in detail in the following embodiment.

Please refer again to FIG. 1. In addition to the emitter mesh electrode 103, receiver mesh electrode 105, and the subsidiary receiver electrode 107, the transparent substrate 101 is also disposed with peripheral traces to transmit the touch-sensing signal generated from the electrodes. As shown in FIG. 1, the emitter mesh electrode 103, receiver mesh electrode 105, and the subsidiary receiver electrode 107 are electrically connected and routed to a channel region 101c through respective peripheral traces 113, 115, 117 near the edge of the substrate. In actual practice, the channel region 101c may be provided with multiple sensing channels (illustrated in the figure as pad form) corresponding and electrically connecting to each peripheral trace 113, 115. Sensing channel 109 may be further electrically connected to the external pins of a flexible printed circuit (FPC), so as to transmit the touch-sensing signal to a control circuit board for processing. Alternatively, in a certain type of panel, the sensing channel 109 may be first electrically connected to a control IC (not shown) and be further electrically connected to the FPC via the control IC.

In order to simplify the drawings and focus on the subject of the present invention, the above-identified control IC, FPC, and control circuit board are omitted in FIG. 1. Another feature shown in the embodiment of FIG. 1 is that the emitter mesh electrode strips 103a or the receiver mesh electrode strips 105a may be electrically connected through peripheral trace 113, 115 and may be electrically connected to a sensing channel through a common peripheral trace. For example, as shown in the figure, the emitter mesh electrode strip 103a and the receiver mesh electrode strip 105a are electrically connected in pair respectively through the peripheral traces 113a and 115a. The advantage of this configuration is that a plurality of emitter mesh electrode strips 103a or a plurality of receiver mesh electrode strips 105a may be electrically connected to single sensing channel 109 through a common peripheral trace. Thus the number of required sensing channels may be further reduced in the touch control circuitry.

More specifically, as shown in FIG. 1, when the user touches the "A" region on the capacitive touch panel 100, a sensing signal will be generated by the sensing electrodes in said "A" region, ex. the emitter mesh electrode strips 103b and the receiver mesh electrode strips 105b in said region. Since in the embodiment the emitter mesh electrode strips 103b and the receiver mesh electrode strips 105b are respectively connected to another of the emitter mesh electrode strips 103c and the receiver mesh electrode strips 105c through peripheral traces 113a and 115a, the sensing signal transmitted to the control IC through the peripheral trace may be the signal generated by one of the emitter mesh electrode strips 103b and 103c or generated by one of the receiver mesh electrode strips 105b and 105c. Therefore, further determination is required to acquire precise touch position. The subsidiary receiver mesh electrode blocks 107a is the one that provides this further determination function. As shown in FIG. 1, when the "A" region is touched, another sensing signal is also generated by the subsidiary receiver mesh electrode block in the bottom-left quadrant, while the subsidiary receiver mesh electrode blocks in other quadrants would not generate any signal. The subsidiary receiver mesh electrode block 107a in the bottom-left quadrant is the block region where the emitter mesh electrode strip 103b and the receiver mesh electrode strip 105b are located rather than the emitter mesh electrode strip 103c and the receiver mesh electrode strip 105c. Thus it can be easily determined that the sensing signal is generated by the emitter mesh electrode strip 103b and the receiver mesh electrode strip 105b instead of the emitter mesh electrode strip 103c and the receiver mesh electrode strip 105c, thereby determining the actual position of "A" region where the touch action occurs. This determination mechanism reflects the efficacy that different sensing blocks defined by the subsidiary receiver electrode may facilitate the determination of precise position where touch action occurs, while the design of common peripheral trace may reduce the number of required sensing channels, which is the ultimate purpose of the present invention.

Figure 2:
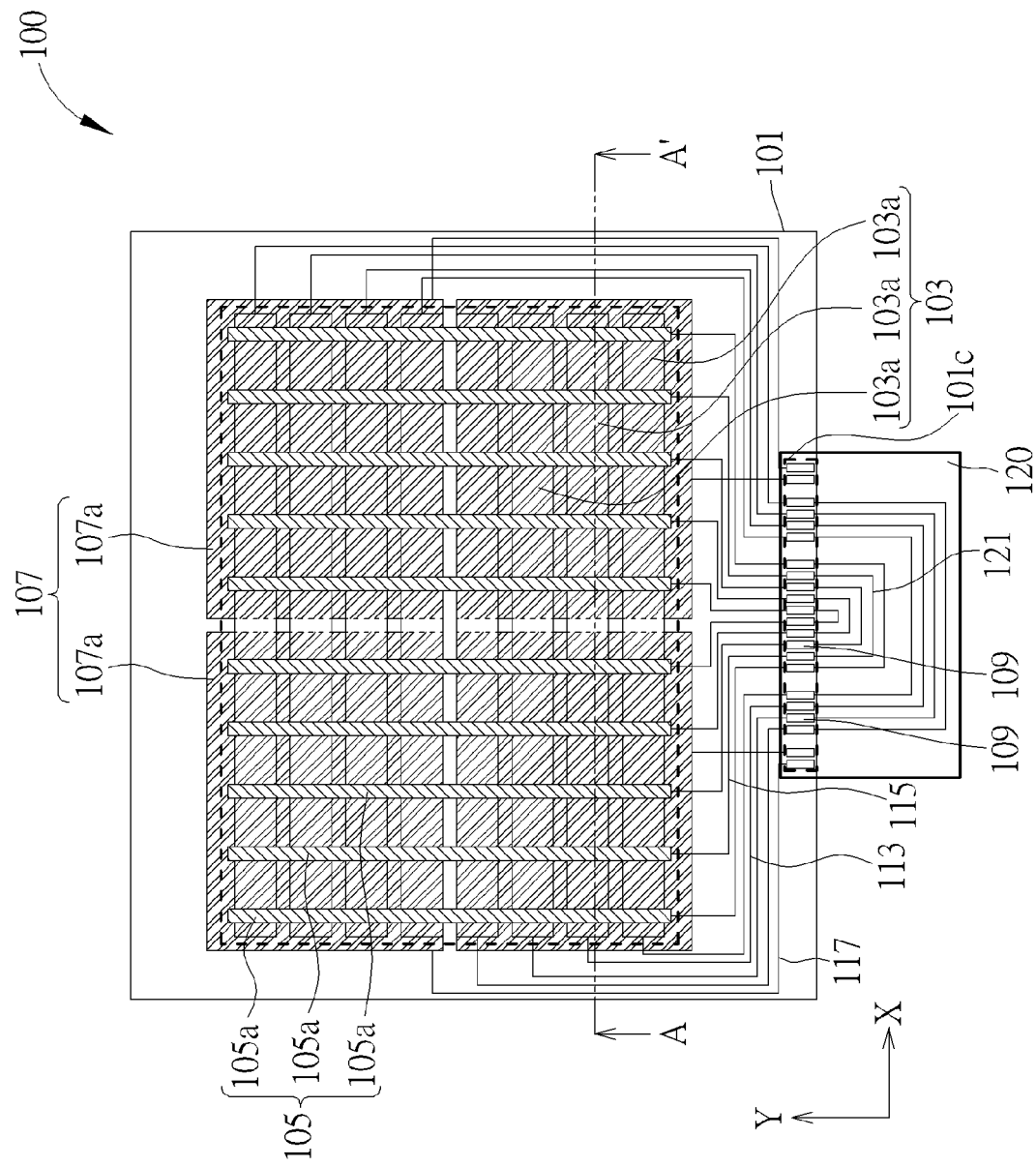
FIG. 2 is a top view a capacitive touch panel in accordance with another embodiment of the present invention.

Please refer now to FIG. 2, which is a top view illustrating a capacitive touch panel in accordance with another embodiment of the present invention. The capacitive touch panel shown in FIG. 2 is similar to the one shown in FIG. 1. The difference between two provided panel structures is that, in the capacitive touch panel shown in FIG. 2, each emitter mesh electrode strip 103a of the emitter mesh electrode 103 and each receiver mesh electrode strip 105a of the emitter mesh electrode 105 are routed to the channel region 101c through respective peripheral trace 113 and 115. That means the emitter mesh electrode strips 103a or the receiver mesh electrode strips 105a are not connected together through peripheral traces like those shown in FIG. 1. This is the routing configuration in a common touch panel circuit, wherein the disadvantage of this design is that more sensing channels 109 are necessary compared to the design in FIG. 1, while the advantage is that the excessive RC value caused by connecting too many electrodes can be prevented. Those skilled in the art may decide to apply which kinds of trace configurations depending on their product requirement. Furthermore, it is illustrated in FIG. 2 that a flexible printed circuit (FPC) 120 is connected with the capacitive touch panel 100. As it is clearly shown in the figure, the sensing channels 109 that each correspond to different electrodes are connected in pairs by the inner circuit 121 of the FPC 120. The efficacy of this trace configuration is like those provided by the peripheral trace 113a and 115a shown in FIG. 1, which the signals generated by a plurality of electrode strips may be transmitted through a single trace, thereby reducing the number of necessary sensing channels. Similar to the mechanism shown in FIG. 1, the signals from corresponding two electrode strips in the left portion and the right portion are transmitted through a single trace, and the subsidiary receiver electrode blocks 107a can facilitate the determination if the signals come from the electrode strips in the left portion or from the electrode strips in the right portion.

Figure 3:
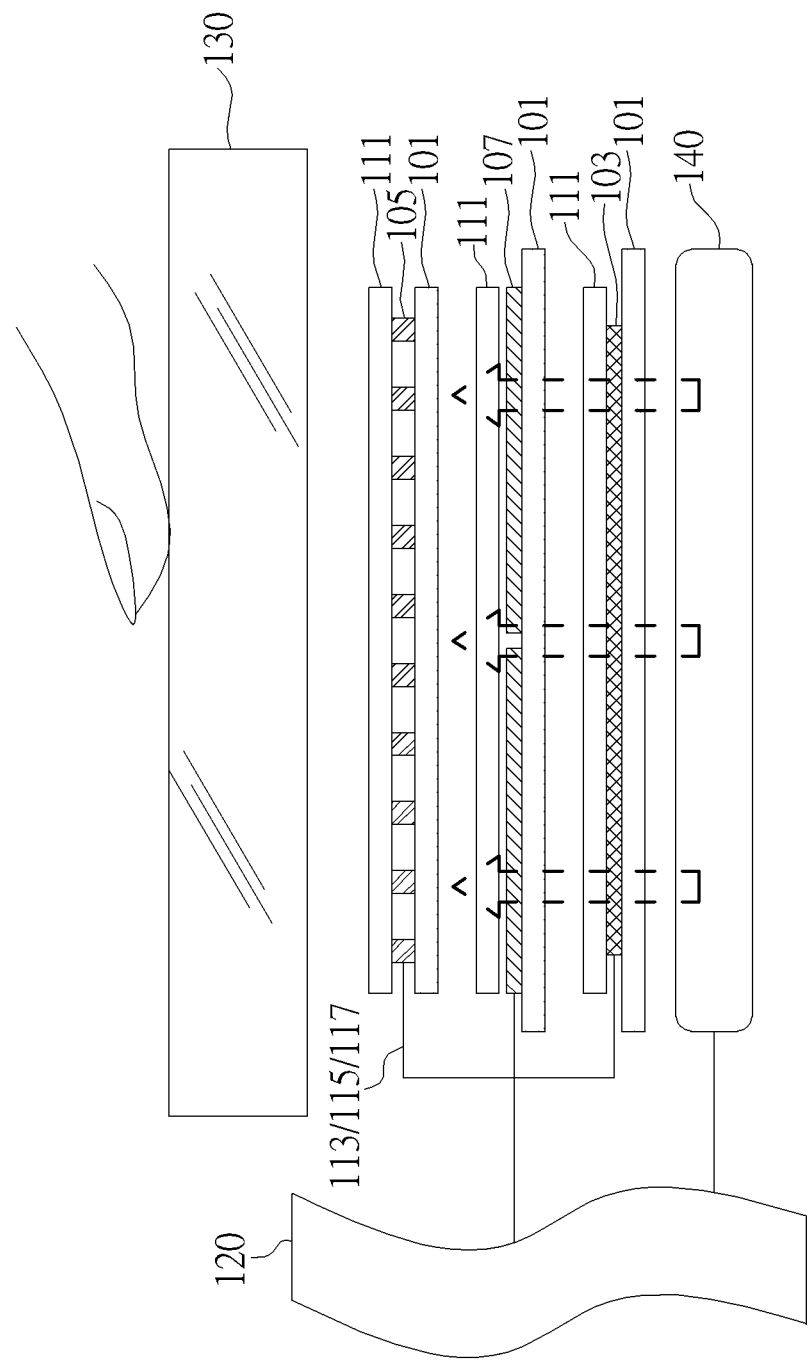
FIG. 3 is a cross-sectional view schematically illustrating a capacitive touch panel with Glass/Film/Film (GFF) structure in accordance with the embodiment of the present invention.

In the following embodiment, the cross-sectional views are used to describe the layer structures and relevant configurations in the capacitive touch panel of the present invention. These drawings can help the readers to get a better understanding to the detailed structure of the capacitive touch panel provided by the present invention. Please refer now to FIG. 3, which is a cross-sectional view schematically illustrating a capacitive touch panel with Glass/Film/Film (GFF) structure taken along the line A-A' in FIG. 2 in accordance with the embodiment of the present invention. The embodiment provided in FIG. 3 can constitute a capacitive touch panel with ultra-slim scale. As shown in FIG. 3, in the embodiment, the emitter mesh electrode 103, the receiver mesh electrode 105 and the subsidiary receiver electrode 107 are disposed on respective transparent substrates 101. It can be seen that the electrodes are disposed on the same side (ex. upper side in this figure) of the transparent substrates 101. A transparent optical clear adhesive (OCA) 111 is disposed on every electrode 103/105/107 to tightly bond and seal the electrode layer. A cover glass, such as a transparent reinforced glass, is provided outside of the capacitive touch panel for the user to perform touch input action by using fingers or stylus pen. A display device 140, such as a LCD device, is provided at opposite side of the capacitive touch panel. It can be seen that the emitter mesh electrode 103, the receiver mesh electrode 105, and the subsidiary receiver mesh electrode 107 are sequentially stacked from bottom to top with overlapped region. All electrodes are routed to FPC 120 by peripheral traces 113/115/117 and further electrically connected to display device 140 through the FPC 120. In this embodiment, the cover glass 130, the transparent substrate (or electrode film) 101, all kinds of mesh electrodes 103/105/107, and the optical film would have sufficient transparency for the image light from the display device 140 to pass through, so that users can see the touch-based images or icons and make corresponding touch actions.

Figure 4:
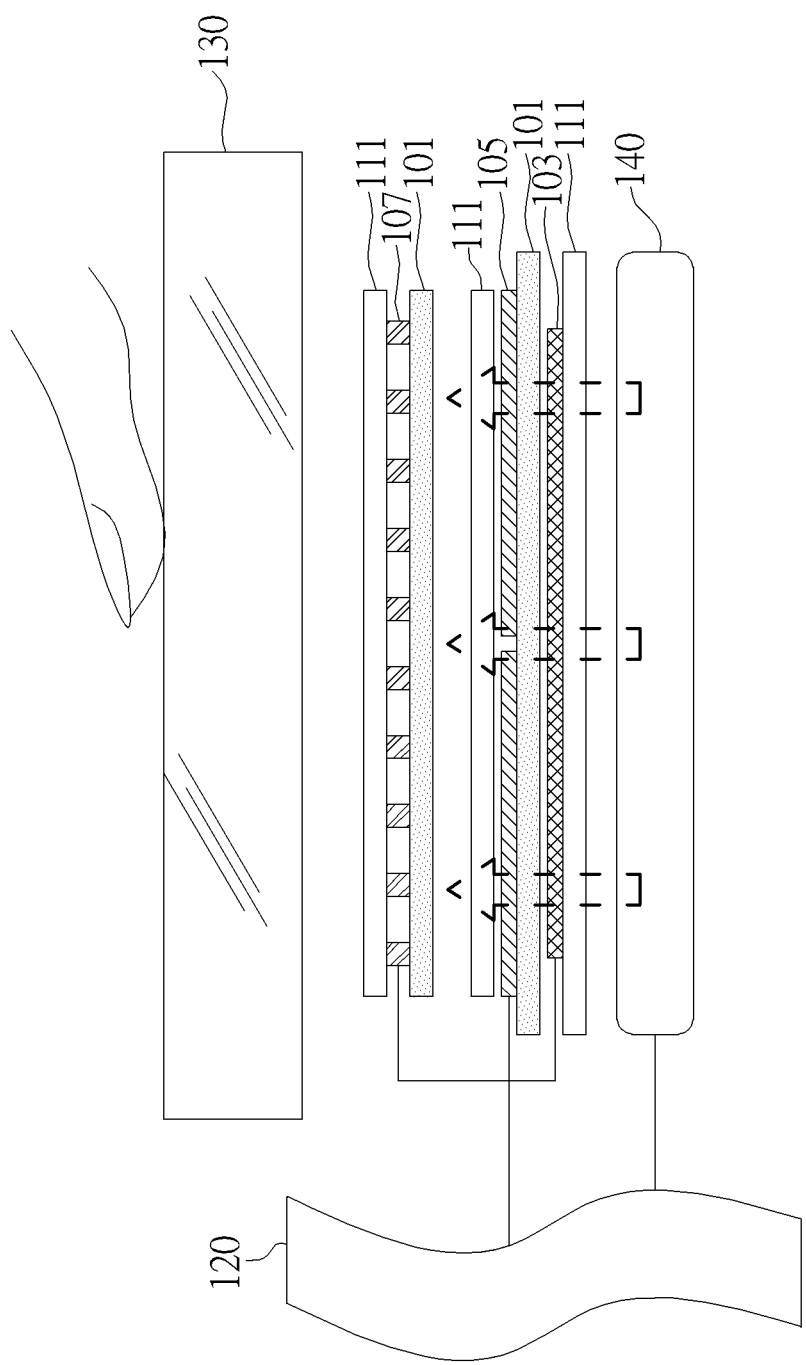
FIG. 4 is a cross-sectional view schematically illustrating a capacitive touch panel with Glass/Film/double ITO (GF-DITO) structure in accordance with another embodiment of the present invention.

Please refer now to FIG. 4, which is a cross-sectional view schematically illustrating a capacitive touch panel with Glass/Film/double ITO (GF-DITO) structure taken along the line A-A' in FIG. 2 in accordance with another embodiment of the present invention. The capacitive touch panel shown in FIG. 4 is similar to the one shown in FIG. 3. The difference between two provided panel structures is that, in the capacitive touch panel shown in FIG. 4, the emitter mesh electrode 103 and the receiver mesh electrode 105 are disposed on opposite sides of one single transparent substrate (or electrode film) 101, thus this configuration is referred in the art as GF-DITO design. The advantage of this design is that the number of necessary transparent substrates 101 can be reduced, thereby achieving the efficacy of further thinning the capacitive touch panel in the present invention.

Please note that the above-described embodiments shown in FIG. 3 and FIG. 4 are exemplary embodiments which respectively show two kinds of most common "add-on" electrode configurations (i.e. GFF type and GF-DITO type) in nowadays capacitive touch panel technology. However, in other embodiments, other different electrode configurations may also be applied with the concept and principle provided by the present invention, such as the electrode configurations of G1, G1F or G2 (OGS), which the electrodes are integrated on the cover glass, or the configurations of On-cell, In-cell or Hybrid-In-Cell, which the electrodes are integrated in the displayer. The present invention is not limited to any specific electrode configuration as long as the design is not against the principle and essential feature provided in the present invention.

In the following embodiment, the drawing is shown to explain the overlapped mesh patterns of all kinds of electrodes and detailed principle how it can reduce the number of necessary sensing channels. FIG. 5 is a schematic view illustrating the mesh patterns and an overlapped mesh pattern of all kinds of mesh electrodes in accordance with the embodiments of the present invention. In the embodiment of FIG. 5, the mesh patterns of all touch-sensing electrodes are represented by periodic rhombus-shaped mesh patterns. However, please note that the present invention may adopt other mesh patterns, such as rectangular, square, rhombus-shaped, circular or irregular-shaped, but is not limited thereto.

As shown in FIG. 5, the emitter mesh electrode (Tx) 103, the receiver mesh electrode (Rx1) 105, and the subsidiary receiver mesh electrode (Rx2) 107 are made of rhombus-shaped mesh patterns. The "mesh" structure referred herein may be generally considered as a transparent layer structure formed by oblique metal strings similar to the spider web, wherein the material of the mesh may be selected from the group of Au, Ag, Pd, Pt, Al, Cu, Ni, Sn and even expensive tin-doped indium oxide (ITO). The mesh patterns may be formed by patterned electrode plating, patterned electroless plating, etching after plating, etching after film deposition, or other available method suitable for forming metal string. It is preferably to perform a black oxide process after the metal mesh is formed so as to form black oxide layer (ex. copper oxide) on the mesh surface to prevent the light reflection by the sensing electrode, thereby improving the visibility of the touch panel. In the scale, the width of the grid is preferably smaller than 10 μm, the grid pitch is preferably smaller than 300 μm, and the grid thickness is preferably smaller than 500 nm. Therefore, the grid area of the overlapped mesh patterns may be kept down to less than 5 percent of the total touch control region, so that the transparency of the touch panel would not be lowered by the over dense mesh pattern.

In the overlapping configuration of the present invention, the general principle is that the mesh patterns of the emitter mesh electrode 103, receiver mesh electrode 105 and the subsidiary receiver electrode 107 are not completely overlapped with each other. This means the mesh patterns of all kinds of sensing electrodes would not completely overlap to form an identical mesh pattern. Preferably, the mesh patterns of the sensing electrodes are overlapped as shown in FIG. 5, wherein the grids in the mesh patterns of three electrodes are alternatively arranged to form a dense mesh pattern with higher mesh density.

In the present invention, the number of necessary sensing channels may be reduced by adding one or more subsidiary receiver mesh electrode 107. Take the example of conventional one emitter to one receiver electrode design, the number of required sensing channels may be calculated by following formula (1) depending on the area of the touch control region:

$$Ch = Size \times \frac{(1+R)}{\sqrt{(1+R^2)}} \Big/ Pitch \qquad (1)$$

According to the result of formula (1), a 55-inch touch panel with 5 mm pitch requires 381 sensing channels, which is twice the number of the required sensing number in a 27-inch touch panel. Such a large number of sensing channels is far beyond the ability of currently available control IC.

However, if we use the peripheral configuration as shown in FIG. 1 with a layer of additional subsidiary receiver electrode 107 to determine the touch zone, the number of required sensing channels may be calculated by following formula (1:

$$Ch = Size \times \frac{(1+R)}{\sqrt{(1+R^2)}} \Big/ (Pitch \times Zone) + Zone \qquad (2)$$

According to the result of formula (2), a 55-inch touch panel with 5 mm pitch and 4 touch zones may require 100 sensing channels, which is much less than the number of required sensing channels in conventional one emitter to one receiver electrode design. This number may be supported by currently available control IC.

Accordingly, the present invention provides an approach of disposing additional, subsidiary receiver mesh electrodes to divide the touch control region of the entire touch panel into multiple touch zones. This innovative design can significantly lower the number of required sensing channels in the panel. Common control ICs may support the panel even if the size of panel is increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive touch panel, comprising:
   transparent substrates;
   a plurality of emitter mesh electrode strips divided into an upper group and a lower group, wherein each of the upper and lower groups comprises at least two emitter mesh electrode strips, each emitter mesh electrode strip in the upper group is electrically connected to a corresponding emitter mesh electrode strip in the lower group to form a plurality of pairs of emitter mesh electrode strips, and each pair of emitter mesh electrode strips is electrically connected to a sensing channel through a single common peripheral trace;
   a plurality of receiver mesh electrode strips divided into a left group and a right group, wherein each of the left and right groups comprises at least two receiver mesh electrode strips, each receiver mesh electrode strip in the left group is electrically connected to a corresponding receiver mesh electrode strip in the right group to form a plurality of pairs of receiver mesh electrode strips, and each pair of receiver mesh electrode strips is electrically connected to a sensing channel through a single common peripheral trace; and
   a plurality of subsidiary receiver mesh electrode blocks, wherein said emitter mesh electrode strips, said receiver mesh electrode strips and said subsidiary receiver mesh electrode blocks are disposed in different layers on said transparent substrates, and said receiver mesh electrode strips partially overlap said subsidiary receiver mesh electrode blocks, wherein said subsidiary receiver mesh electrode blocks define a plurality of touch-sensing blocks on a touch region of said capacitive touch panel, and when a touch action occurs on the touch region, said touch-sensing blocks determine an actual position where the touch action occurs.

2. The capacitive touch panel of claim 1, wherein the mesh patterns of said emitter mesh electrode strips, said receiver mesh electrode strips and said subsidiary receiver mesh electrode blocks are alternately arranged to constitute a dense mesh pattern with higher mesh density than said mesh patterns.

3. The capacitive touch panel of claim 2, wherein the grid area of said dense mesh pattern is less than 5 percent of the touch control region of said transparent-substrates.

4. The capacitive touch panel of claim 1, wherein said emitter mesh electrode strips are arranged in parallel along a first direction, and said receiver mesh electrode strips are arranged in parallel along a second direction.

5. The capacitive touch panel of claim 4, wherein said first direction is orthogonal to said second direction.

6. The capacitive touch panel of claim 1, wherein the mesh patterns of said emitter mesh electrode strips, said receiver mesh electrode strips and said subsidiary receiver mesh electrode blocks are selected from rectangular, square, rhombus-shaped, circular or irregular-shaped.

7. The capacitive touch panel of claim 1, wherein said emitter mesh electrode strips, said receiver mesh electrode strips and said subsidiary receiver mesh electrode blocks are disposed on the same side of said transparent substrate.

8. The capacitive touch panel of claim 1, wherein said emitter mesh electrode strips, said receiver mesh electrode strips and said subsidiary receiver mesh electrode blocks are disposed on opposite sides of one of said transparent-substrates.

9. The capacitive touch panel of claim 1, wherein the material of said transparent substrates comprises glass, PET (poly-ethylene terephthalate), PC (polycarbonate), PMMA (poly methyl methacrylate), PEN (polyethylene naphthalate), PES (poly-ethersulpon), COP (cyclic olefin polymer), TAC (triacetyl-cellulose), PVA (polyvinyl alcohol), PI (polyimide) or PS (polystyrene).

10. The capacitive touch panel of claim 1, further comprising optical films disposed between said transparent substrates, said emitter mesh electrode strips, said receiver mesh electrode strips and said subsidiary receiver mesh electrode blocks.

11. The capacitive touch panel of claim 1, wherein the grid width of said emitter mesh electrode strips, said receiver mesh electrode strips and said subsidiary receiver mesh electrode blocks are smaller than 10 μm, and the grid pitch of said emitter mesh electrode strips, said receiver mesh electrode strips and said subsidiary receiver mesh electrode blocks are smaller than 300 μm.

12. The capacitive touch panel of claim 1, wherein the grid thickness of said emitter mesh electrode strips, said receiver mesh electrode strips and said subsidiary receiver mesh electrode blocks are smaller than 500 nm.

13. The capacitive touch panel of claim 1, wherein the material of said emitter mesh electrode strips, said receiver mesh electrode strips and said subsidiary receiver mesh electrode blocks are selected from the group of Au, Ag, Pd, Pt, Al, Cu, Ni, Sn, ITO and the combination thereof.

* * * * *